United States Patent [19]

Laidler et al.

[11] 4,176,158
[45] Nov. 27, 1979

[54] PROCESS FOR CONCENTRATING TECHNETIUM-99M

[75] Inventors: John B. Laidler; Roy H. Abrahams, both of Amersham, England

[73] Assignee: The Radiochemical Centre Ltd., England

[21] Appl. No.: 654,877

[22] Filed: Feb. 3, 1976

[30] Foreign Application Priority Data

Feb. 3, 1975 [GB] United Kingdom ............... 4618/75

[51] Int. Cl.² ............................................. C01G 57/00
[52] U.S. Cl. ...................................... 423/2; 210/31 R; 252/301.1 R; 423/49
[58] Field of Search ..................... 424/1; 252/301.1 R; 423/2, 49; 210/31 R

[56] References Cited

U.S. PATENT DOCUMENTS 3,774,036  11/1973  Gerhart ........................ 252/301.1 R
3,902,849  9/1975  Barak et al. .............................. 424/1

OTHER PUBLICATIONS

Bio–Rad Laboratories, "Price List S ", p. 11, Feb. 1, 1967.

Primary Examiner—Edward A. Miller
Attorney, Agent, or Firm—Wenderoth, Lind & Ponack

[57] ABSTRACT

The radioactive concentration of technetium-99m contained as pertechnetate ion in aqueous solution is increased by
(1) acidifying the solution,
(2) contacting the acid solution with a bifunctional ion-exchange material which is an anion-exchanger under acid conditions and a cation-exchanger under alkaline conditions, so that pertechnetate ion is retained thereon, and
(3) eluting the pertechnetate ion with a small amount of aqueous alkaline liquid.

9 Claims, 1 Drawing Figure

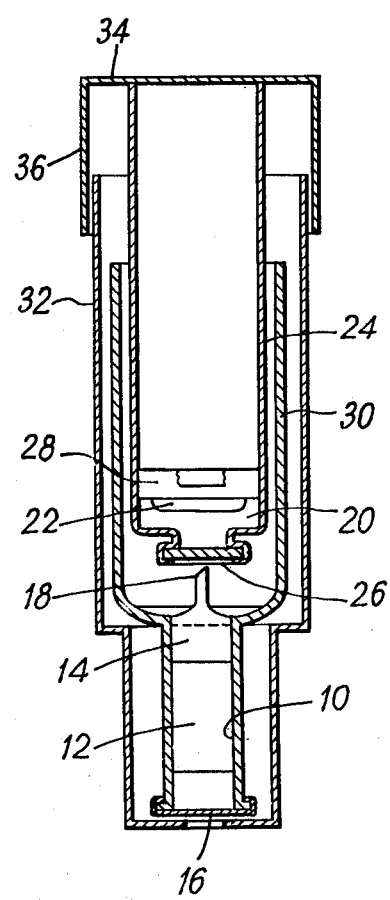

PROCESS FOR CONCENTRATING TECHNETIUM-99M

Technetium-99m generators comprise molybdenum-99 carried on a column of, for example, alumina. Technetium-99m is continuously generated on the column by radioactive decay, and can be eluted using aqueous saline solution as pertechnetate ion $TcO_4^-$. Such generators have a lifetime of about a week (the half lives of molybdenum-99 and technetium-99m are respectively 67 hours and 6 hours) and are very widely used.

Molybdenum-99 is conventionally made by irradiating either natural molybdenum, or molybdenum enriched in molybdenum-98, with neutrons in a reactor. Generators using molybdenum-99 produced by irradiation of molybdenum can be eluted once a day to provide solutions of technetium-99m at a radioactive concentration of up to 50 mCi/ml but this may decrease to less than 5 mCi/ml during the life of the generator. There are some uses for which this concentration is not high enough; an example is for bolus injections for dynamic studies where a concentration of 20 mCi/ml is commonly required. There has been for 3 or 4 years a widespread need for solutions of technetium-99m at higher concentrations than can be obtained in the eluant of a conventional generator, and this need has been growing more acute with time. Many attempts have been made to fulfil this need, notably the following:

(A) Molybdenum-99 produced by irradiation of molybdenum has been replaced by fission product molybdenum-99, which has an enormously higher specific activity and can be used in much smaller generators. But separated fission products are very expensive and environmentally undesirable, in that their production gives rise to large quantities of highly radioactive by-product waste.

(B) Technetium-99m has been solvent extracted from reactor molybdenum-99, and the organic solvent removed by evaporation to leave the technetium-99m as a solid or concentrated aqueous solution. This procedure is too complex to be practised except in the largest hospitals.

(C) Pertechnetate ion in the eluate from conventional generators has been reduced by ferrous iron, co-precipitated with ferrous hydroxide, and re-dissolved in acid containing a chelating agent. Such a procedure is excessively complex and time-consuming, bearing in mind that the half life of the technetium-99m is only 6 hours. It also yields the technetium-99m in the form of a strong complex which is undesirable for certain applications.

(D) U.S. Pat. No. 3,749,556 describes a technique in which the eluate from a conventional generator is passed through a bed of powdered iron which reduces the pertechnetate ion and absorbs it while the remainder of the eluate is removed. The absorbed technetium-99m is then recovered by elution with a complexing agent therefor such as an organic acid. A disadvantage of the technique is that the technetium-99m is recovered in reduced form and as a complex which may be inappropriate for its intended use.

The variety of these attempts indicates the magnitude of the problem.

The present invention provides a method of increasing the radioactive concentration of techentium-99m in an aqueous solution containing the technetium-99m as a pertechnetate ion $TcO_4^-$ which method comprises the steps of:

(1) if the solution is not already acidic, acidifying it, (2) contacting the resulting acid solution with a bifunctional ion-exchange material which is an anion-exchanger under acid condition and a cation-exchanger under alkaline conditions, so that pertechnetate is retained thereon, (3) contacting the material used in step (2) with an aqueous alkaline liquid, of smaller volume that the starting material so as to recover pertechnetate ion therefrom, and (4) neutralising the resulting alkaline solution to obtain a solution containing pertechnetate ion at a higher concentration than the eluate starting material.

A usual source of the starting aqueous solution of pertechnetate ion is a technetium-99m generator. When such a generator is used, there are three ways of effecting step (1).

These are:

(a) Eluting the technetium-99m generator with an acidic eluant such as hydrochloric acid. In this case, of course, further acidification of the eluate will not normally be necessary.

(b) Adding acid to the eluate. This involves diluting the pertechnetate when the object of the process is to concentrate it and is accordingly not preferred. When it is used, the concentration of the added acid should normally be as high as possible.

(c) Contacting the eluate, conveniently a saline solution containing pertechnetate, with a cation-exchange resin in the hydrogen form. The nature of the cation-exchange resin is not critical, though it should preferably be a sufficiently strong cation exchanger to reduce the pH of the solution to a value not exceeding 2.2. We have found the Dow Chemical Company resin sold by Bio-Rad Laboratories under the Trade Mark Bio Rad AG 50W-X12 to be suitable; this resin is described as a strongly acidic cation exchange resin composed of nuclear sulphonic acid exchange groups attached to a styrene-divinylbenzene polymer lattice.

The amount of the cation exchange resin used must be at least sufficient to reduce the pH to the desired extent by removing e.g. sodium ions from the eluate starting in step (1). The resin may advantageously also be used to neutralise the alkaline solution in step (4); in this case more will be required. The amount in any particular instance can be quite readily determined by calculation or experiment.

The material used in step (2) may be an ion exchange resin particularly a chelating resin, with bifunctional properties, which strongly binds pertechnetate ion under acid conditions but readily releases it under alkaline conditions. We have found the chelating resin sold by Bio-Rad Laboratories under the Trade Mark Chelex 100 to be suitable, for example, in the hydrogen or the sodium form.

Chelex 100, chelating resin is a styrene divinylbenzene copolymer containing imminodiacetate functional groups that is structurally classed with the weak acid cation exchangers by virtue of its carboxylic acid groups. It is distinguished dynamically from ordinary exchangers in three respects:

(1) Selectivity is high, a function not of ion size, charge or physical property but primarily of the chelating group (2) Bond strength is of the order of 15–25 kilocal/mole. In ordinary exchangers bond strength is usually of the order of 2–3 kilocal/mole.

(3) Kinetics are somewhat slower and governed by particle diffusion or second order kinetics and not by diffusion alone as is the case with other exchangers.

Chelex 100 differs from the strong sulfonic acid exchangers in its more efficient regeneration in dilute acid, and its ability to operate in basic, neutral and weakly acid solutions of pH 4 or higher. *At very low pH, Chelex 100 actually acts as an anion exchanger.* The titration of Chelex 100 products the following zwitterionic forms as a function of pH:

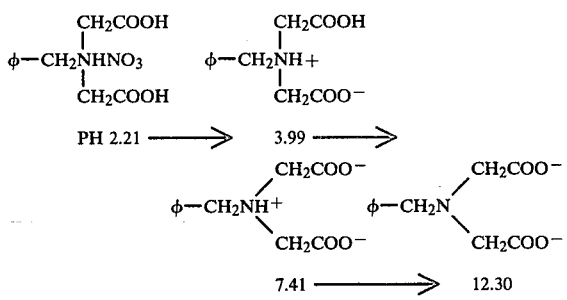

It is this ability to act as an anion exchanger at low pH which makes Chelex 100 particularly suitable in our invention, and it is believed that any bifunctional ion-exchange material, i.e. one which is an anion exchanger under acid conditions and a cation exchanger under alkaline conditions, is likely to be suitable. Other possible bifunctional adsorbent materials include amphoteric inorganic oxides such as alumina, zirconia and hydrated ferric oxide. As will be apparent, the acid solution used in step (2) must be at a pH at which the pertechnetate ion is retained on the material; when Chelex 100 is used, the pH of the acid solution should be not more than 2.2, preferably less than 2.0.

The amount of chelating resin or other material used in step (2) must be at least sufficient to retain all the pertechnetate ion; this amount is readily determined by experiment. In order to obtain an end product containing the highest concentration of pertechnetate ion it is preferred to use as little material in this step, and indeed in other steps, of the method as possible. The ratio by volume of the cation exchange resin used in step (1) to the chelating resin used in step (2) is likely to be at least 2:1, preferably at least 3:1.

At the end of step (2), the operator will have pertechnetate ion adsorbed on chelating resin or other material, and an acid liquid. It is possible to discard this liquid. However, since the liquid may also contain a minor proportion of the pertechnetate ion, commonly less than 5%, some of it is preferably converted into the alkaline liquid for step (3). This may be done in a variety of ways:

(a) Sodium hydroxide in solid form or aqueous solution, is added to some or all of the acid liquid. The object of this addition is to raise the pH of the liquid to a value at which the pertechnetate ion can be rapidly recovered from the chelating resin or other material on which it is adsorbed. The amount of sodium hydroxide used will depend on the pH required for recovery of the pertechnetate ion, and can readily be determined by calculation or experiment. For example, pertechnetate ion may readily be eluted from Chelex 100 by an alkaline solution preferably with a pH greater than 12. It is preferred not to use more alkali than is required to achieve this purpose with a sufficient margin of safety.

(b) Sodium hydroxide plus a buffer, in solid form or aqueous solution, may be added to some or all of the said liquid. The use of a buffer, e.g. a phosphate buffer, may reduce the amount of alkali required without increasing the risk of finishing with a final solution which is markedly acid or alkaline.

(c) Some or all of the acid liquid, preferably mixed with an appropriate quantity of sodium chloride, is contacted with an anion exchange resin in the hydroxyl form so as to raise its pH to the desired value. The nature of the anion exchange resin is not critical, though desirably it is a strongly basic anion exchanger. We have used the resin sold by Bio-Rad Laboratories under the Trade Mark Bio-Rad AG1-X8; this is described as a strongly basic anion exchange resin composed of quaternary ammonium exchange groups attached to a styrene-divinylbenzene polymer lattice.

The use of solid alkali, or an anion exchange resin, has the advantage that the volume of the acid liquid being treated is not increased; also, solid alkali is less corrosive than liquid to conventional glass containers with rubber closures. All or part of the resulting alkaline solution (or a fresh alkaline solution if the acid liquid from step (2) was discarded) is then contacted with the chelating resin or other material in order to recover the pertechnetate ion from it. As indicated above, the pH of the alkaline liquid is chosen to be appropriate for this purpose. The volume of alkaline liquid used (which must, of course, be sufficient to elute the pertechnetate ion) determines the degree of concentration of technetium-99m by the method. We have successfully concentrated a 15 ml eluate starting volume to 5 ml. The process will concentrate larger eluate starting volumes to a similar final volume, although the use of such volumes would necessitate some adjustment of the other parameters, notably the alkali concentration.

On completion of step (3), the operator has an alkaline liquid containing sodium, hydroxide and pertechnetate ions. This is then neutralised, conveniently by contact with the same cation exchange resin used in step (1), to give a solution containing pertechnetate ion at a higher concentration than the eluate starting material.

Reduction of the volume of the eluate starting material by a factor of 3 implies increasing the concentration of pertechnetate ion by a factor of slightly less than 3, for example from 2.6 to 3.0, taking account of processing losses. This factor 3 is of particular significance to us, since our generators using irradiated molybdenum are designed to give an eluate of 15 ml while most generators using fission-product molybdenum-99 are designed to give an eluate of 5 ml. The method of this invention has the following advantages:

(i) it prolongs the useful life of a generator
(ii) the concentrate can be used for bolus injections
(iii) it enables a generator to be eluted only 4–5 hours after the last elution, instead of 24 hours as is usual. In this connection, the technetium-99m activity (expressed as a percentage of the molybdenum activity at the time of elution) has only grown to about 30% after 4 hours, whereas it reaches 86% after 24 hours.

(iv) it is usual to obtain the eluate from a technetium-99m generator in a sterile form in which it can be directly injected. The concentration method of the present invention can readily be performed without loss of sterility.

(v) the technetium-99 in the concentrate is present as pertechnetate in saline solution.

This invention is expected to be of particular value for concentration of large volumes of Tc-99m pertechnetate for a separated Tc-99m distribution service. Such distribution services commonly utilise the complex solvent extraction process or an equally complex high temperature distillation process whereas this invention would permit concentration of large volumes of dilute pertechnetate obtained by simple elution of high activity generators. For example, a daily distribution service of about 4 Ci/day Tc-99m, at a reference time 18 hours after separation from the parent molybdenum-99, could be based on a conventional alumina adsorbent generator loaded with 150 Ci of Mo-99 and eluted daily for a week. The Mo-99 used could have a relatively low specific activity of about 1 Ci/gm and the pertechnetate could be eluted with about 10 liters of 0.1 N hydrochloric acid. Concentration of the eluate by a factor of 25 to provide 400 ml of Tc-99m solution at a radioactive concentration of 10 mCi/ml, at a reference time 18 hours after separation from the parent molybdenum-99, could be achieved by adsorption of pertechnetate on Chelex resin followed by desorbtion with alkali and subsequent neutralisation of the alkaline pertechnetate eluate.

Accordingly, the invention contemplates the use of generators containing from 10 mCi up to 1000 Ci or more of molybdenum-99 at a concentration of at least 0.1 Ci/gm; the concentration of eluates having a starting volume of from 5 ml up to 100 liters or even more; said concentration being by a factor of from 1.1 to 100 or more.

In another aspect, the present invention provides a device for performing the method hereinbefore defined, which device comprises a column containing a layer of cation-exchange resin in the hydrogen form and a layer of bifunctional ion-exchange material which is an anion-exchanger under acid conditions and a cation-exchanger under alkaline conditions; a supply of alkali; means for introducing an aqueous solution of pertechnetate ion into the column for contact successively with the cation exchange resin, the bifunctional ion-exchange material, and the alkali; and a receptacle for the liquid so treated; the device being so constructed and arranged that a part of the treated liquid can be withdrawn from the receptacle through the column, making contact successively with the bifunctional ion-exchange material and with the cation exchange resin and recovered.

Preferably the column and receptacle are maintained in a sterile state and the means for introducing solution into the column comprises a sterile coupling means such as a pierceable autoclavable closure.

The accompanying drawing is an axial section through a device according to the invention of cylindrical cross-section. A column 10 contains a bed 12 of Bio Rad AG50W-X12 or other cation exchange resin in the hydrogen form, and a bed 14 of Chelex 100 or other chelating resin or material to retain technetium-99m thereon. The column 10 is closed at one end by a pierceable autoclavable closure (p.a.c.) 16, and terminates at the other end in a needle 18. A receptacle 20 contains a supply 22 of sodium hydroxide or other alkali. The receptacle 20 takes the form of a tube 24 closed at one end by a p.a.c. 26 adjacent the needle 18. An air and liquid tight rubber piston 28 is movable up and down the tube 24 and defines the other end of the receptacle 20. An open-ended inner casing 30 is fixed to the column 10 and loosely surrounds the tube 24, holding the two in axial alignment. A two part outer casing comprising a body 32 and a lid 34 completely surrounds the device except for the pierceable autoclavable closure 16, and is made of a radiation shielding material. The lid 34 of the casing has a cylindrical skirt 36 which loosely surrounds the cylindrical wall of the main casing member 32.

The operator removes the lid 34 from the body 32 and inserts the inner casing 30 containing the tube 24. He replaces the lid 34 and squeezes the two ends of the outer casing together, thus causing the needle 18 to puncture the p.a.c. 26. He connects the device to the technetium-99m generator outlet so that the eluate (15 ml of sterile saline solution) flows through the p.a.c. 16 and into the column 10. The liquid passes through the column where it contacts first the bed of cation exchange resin 12, where the pH is reduced to below 2, and then the bed of chelating resin 14 which retains the pertechnetate ion. The liquid passes through the needle 18 into the receptacle 20 where it dissolves the sodium hydroxide 22, the pH thus being raised above 12.

The operator then detaches the device from the generator, inserts another needle through the p.a.c. 16 and withdraws 5 ml of alkaline liquid from the receptacle 20. This liquid passes through the column 10, contacting first the bed of chelating resin 14 and eluting pertechnetate ion therefrom, and then the bed of cation exchange resin 12 where the pH is reduced to about 7, e.g. 5.5 to 8. Finally the liquid is withdrawn by the operator as 5 ml of sterile saline solution containing substantially all the technetium-99m that was present in the eluate starting material. The column 10, casing 30 and tube 24 are discarded after use. Alternatively the column 10 may be regenerated for re-use by elution with hydrochloric acid. The following Examples illustrate the method of the invention.

EXAMPLE 1

The eluate from a technetium-99m generator (15 ml of saline solution containing technetium-99m as pertechnetate ion) was passed through 1.2 ml of cation exchange resin (Bio Rad AG 50W-X12) in the hydrogen form, surmounting 0.4 ml of chelating resin (Chelex 100) in the sodium form, into a collector containing 4.8 ml of 1 M sodium hydroxide. 5 ml of the resulting eluate mixture was drawn back through the chelating resin followed by the cation exchange resin. The product contained 95% of the starting technetium-99m, giving a concentration factor of 2.85.

Chelex 100 shrinks by about 50% when converted from sodium form to the hydrogen form. The experiment can be repeated using 0.2 ml of Chelex 100 in the hydrogen form with substantially the same result, except that slightly more sodium hydroxide is required.

EXAMPLE 2

The eluate from a technetium-99m generator (15 ml) was passed through 0.8 ml of Bio Rad AG 50W-X12 cation exchange resin in the hydrogen form, surmounting 0.4 ml of Chelex 100 chelating resin in the sodium form, into a collector containing 4.5 ml of phosphate buffer (pH 6.4) plus 2.85 ml of 1 M sodium hydroxide. 5 ml of the resulting eluate mixture was drawn back through the two resins in the reverse order. The product contained 90% of the starting technetium-99m, giving a concentration factor of 2.7.

EXAMPLE 3

The eluate from a technetium generator (15 ml) was passed through 1.1 ml of Bio Rad 50W-X12 cation exchange resin in the hydrogen form, surmounting 0.4 ml of Chelex 100 chelating resin in the sodium form into a collector containing 180 mgm of sodium chloride. 5 ml of the resulting mixture was drawn back through 1.0 ml of anion exchange resin (Bio Rad AG1-X8) in the hydroxyl form, the chelating resin and the cation exchange resin. The product contained 86% of the starting technetium-99m giving a concentration factor of 2.6.

EXAMPLE 4

1 liter of 0.1 M hydrochloric acid and containing 1 mCi of Tc-99m as pertechnetate was passed through a 4.5 ml bed of Chelex-100 resin in the acid form. The uptake of Tc-99m onto the Chelex resin was greater than 99%. The Chelex resin was then eluted with 15 mls of 1 M sodium hydroxide stripping 94% of the adsorbed technetium-99m. The concentration factor was thus 62.

This experiment was performed on a tracer scale to demonstrate technique. It could equally well have been performed on a pertechnetate solution of much higher activity, without modification, to achieve the same concentration factor.

What we claim is:

1. A method of increasing the radioactive concentration of technetium-99m in an aqueous solution containing the technetium-99m as pertechnetate ion $TcO_4^-$ which method consists essentially of the steps of:
   (1) if the solution is not already acid, acidifying it,
   (2) contacting the resulting acid solution with a bifunctional ion-exchange material which is an anion-exchanger under acid conditions and a cation-exchanger under alkaline conditions, the pH of the solution being such that the bifunctional ion exchange material in contact with it acts as an anion-exchanger and adsorbs pertechnetate thereon, and recovering the acid bifunctional ion-exchange material with pertechnetate ion carried thereon and an acid liquid substantially free of pertechnetate ion,
   (3) contacting the material resulting from step (2) with an aqueous alkaline liquid, of smaller volume than the aqueous starting solution treated in step (1), the pH of the aqueous alkaline liquid being such that the bifunctional ion-exchange material in contact therewith acts as a cation-exchanger and releases pertechnetate adsorbed thereon, and recovering an aqueous alkaline solution containing pertechnetate ion, and
   (4) neutralizing the alkaline solution recovered in step (3) to obtain an aqueous solution containing pertechnetate ion at a higher concentration than the starting material.

2. A method as claimed in claim 1, wherein the aqueous solution of pertechnetate ion is the eluate from a technetium-99m generator.

3. A method as claimed in claim 2, wherein the eluate from the technetium-99m generator comprises a saline solution containing technetium-99m as pertechnetate and is acidified in step (1) by contact with a cation exchange resin.

4. A method as claimed in claim 3, wherein the cation-exchange resin used in step (1) is also used in step (4) to neutralise the alkaline solution.

5. A method as claimed in claim 1 wherein the bifunctional ion-exchange resin used in step (2) is a chelating resin.

6. A method as claimed in claim 1, wherein the aqueous alkaline liquid used in step (3) is formed by raising to more than 7.00 the pH of the acid liquid recovered in step (2).

7. A method as claimed in claim 2, wherein the technetium-99m generator contains from 10 mCi up to 1000 Ci of molybdenum-99 at a concentration of at least 0.1 Ci per gram; the eluate therefrom to be concentrated has a starting volume of from 5 ml up to 100 liters; and the final aqueous solution contains pertechnetate ion at a higher concentration than the starting aqueous solution by a factor of from 1.1 up to 100.

8. A method as claimed in claim 5, wherein the chelating resin is a styrene-divinylbenzene copolymer containing iminodiacetate functional groups.

9. The method according to claim 1 wherein said alkaline liquid contains sodium hydroxide.

* * * * *